United States Patent [19]

Wauer et al.

[11] Patent Number: 4,652,742
[45] Date of Patent: Mar. 24, 1987

[54] ARRANGEMENT FOR AND METHOD OF DETERMINING TWO OR MORE SUPERIMPOSED FILM SHEETS

[75] Inventors: Dieter Wauer, Taufkirchen; Herbert Plaschke, Gernlinden; Otto Butz; Josef Ganser, both of Munich, all of Fed. Rep. of Germany

[73] Assignee: AGFA-Gevaert AG, Leverkusen, Fed. Rep. of Germany

[21] Appl. No.: 822,924

[22] Filed: Jan. 24, 1986

Related U.S. Application Data

[63] Continuation of Ser. No. 521,739, Aug. 9, 1983, abandoned.

[30] Foreign Application Priority Data

Aug. 17, 1982 [DE]  Fed. Rep. of Germany ....... 3230524

[51] Int. Cl.$^4$ ............................................. G01N 9/24
[52] U.S. Cl. ................................ 250/223 R; 250/205; 271/263; 364/184
[58] Field of Search .................... 250/205, 223 R, 557, 250/559, 571, 572, 562; 356/429–432, 434, 239; 271/262, 263; 364/183, 184, 900; 340/674, 675

[56] References Cited

U.S. PATENT DOCUMENTS

| | | | |
|---|---|---|---|
| 3,591,294 | 7/1971 | Neil | 356/429 X |
| 3,614,419 | 10/1971 | Daughton et al. | 250/223 R |
| 4,097,731 | 6/1978 | Krause et al. | 250/205 |
| 4,155,012 | 5/1979 | Clarke et al. | 356/431 X |
| 4,428,041 | 1/1984 | Honkawa | 271/263 |

Primary Examiner—Edward P. Westin
Attorney, Agent, or Firm—Michael J. Striker

[57] ABSTRACT

An arrangement for determining two or more superimposed film sheets, particularly X-ray film sheets, in a transport after their withdrawal from the film sheet stack, has a light barrier with a light source at one side of the transport path and a photoreceiver at the other side thereof, and an evaluating circuit connected with the photoreceiver for producing a signal corresponding to the presence of two or more sheets and including a computer supplied with a value of the density of a first or test sheet introduced into the light barrier between the light source and the photoreceiver, so that the supplied value serves as a reference signal for measuring the next film sheet.

8 Claims, 3 Drawing Figures

ARRANGEMENT FOR AND METHOD OF DETERMINING TWO OR MORE SUPERIMPOSED FILM SHEETS

This application is a continuation of application Ser. No. 521,739, filed Aug. 9, 1983, now abandoned.

BACKGROUND OF THE INVENTION

The present invention relates to an arrangement for determining two or more superimposed film sheets, particularly X-ray film sheets, in their transport path after withdrawal from a film sheet stack. A light source of a light barrier is located at one side and a photoreceiver of the light barrier is located at the other side of the transport path. The photoreceiver is connected with an evaluating circuit which produces a signal corresponding to the presence of two or more superimposed sheets. The invention also relates to a method of determining two or more superimposed sheets.

Arrangements of the above mention general type are known in the art. One such arrangement is disclosed, for example, in the U.S. Pat. No. 3,882,308. In this arrangement, two photoreceivers are located opposite to the light source. A test sheet lies in a path of light of one photoreceiver, whereas the other photoreceiver controls the transport path of processed sheets. Such an arrangement is, however, expensive and brings a danger of false measurements, inasmuch as the density of the test sheet in the event of irradiation with infrared light changes with time. Because of this, the test sheet must be continuously replaced. This replacement must be performed for each individual exchange of the film material. When it is forgotten to replace the test sheet, the false measurement can take place.

SUMMARY OF THE INVENTION

Accordingly, it is an object of the present invention to provide an arrangement for determining two or more superimposed film sheets, which avoids the disadvantages of the prior art.

More particularly, it is an object of the present invention to provide an arrangement for determining two or more superimposed film sheets, which guarantees with simple means a reliable determination of the two or more sheets; another object of this invention is to dispense with an additional reference film sheet so that the operational convenience is increased.

In keeping with these objects and with others which will become apparent hereinafter, one feature of the present invention resides, briefly stated, in an arrangement of the above mentioned type in which a computer is supplied with a value of the density of a first film or test film sheet introduced into the light barrier between the light source and the photoreceiver, and the supplied value is used as a reference signal for measuring the next film sheet.

The inventive method includes the steps of supplying a value of the density of a first film sheet or test film sheet introduced into the light barrier between the light source and the photoreceiver, and using the supplied value as a reference signal for measuring the next film sheet.

When the arrangement is designed and the method is performed in accordance with the present invention, the arrangement has only one photoreceiver and operates without use of an additional reference sheet, and it can be automatically calibrated according to the employed sheet material.

With the evaluating circuit, it is also possible to determine an empty measuring barrier, or in other words when no film sheet is travelling.

The inventive arrangement and method make possible to adjust the actual value measured for each new film sheet to the nominal value adjusted in the circuit, and to use the same as a new intensity value for the light source. Thereby false measurements because of aging optoelectronic structural parts or because of density changes in the material are avoided.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
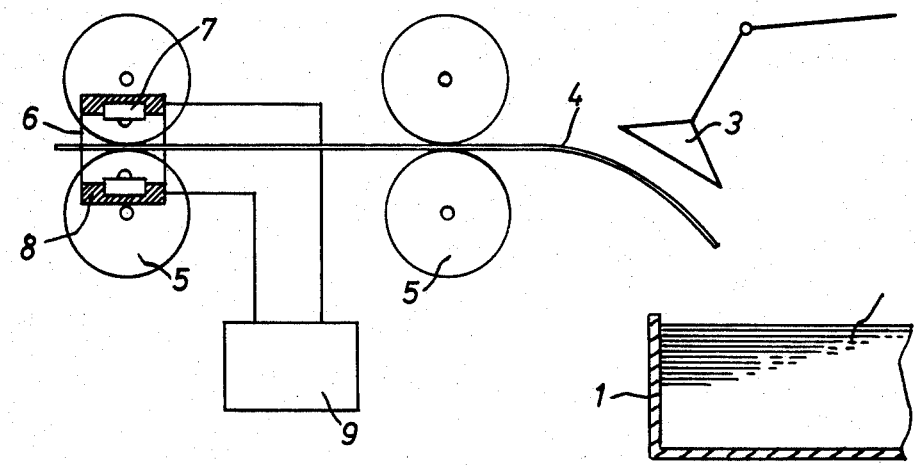
FIG. 1 is a view schematically showing a transport path for a film sheet, with a light barrier for multiple sheet determination.

FIG. 1 shows a container which is identified with reference numeral 1 and accommodates a stack of film sheets 2. Suction device is identified with reference numeral 3. The suction device 3 transfers a film sheet 4 to two pairs of transport rollers which are identified with reference numerals 5 and are located one behind the other. The pairs of transport rollers 5 are formed either by individual small rollers, or a cut-out is formed in the second pair of rollers in the region of the movement path of the sheets, in which a measuring light barrier 6 is arranged.

The measuring light barrier 6 has an infrared transmitter 7 arranged at one side of the movement path for the film sheet 4, and a photoreceiver 8 arranged opposite to the transmitter 7 at the other side of the movement path of the film sheet. The light transmitter or source 7 and the photoreceiver 8 are connected with an evaluating circuit 9 which is illustrated in detail in FIG. 2.

Figure 2:
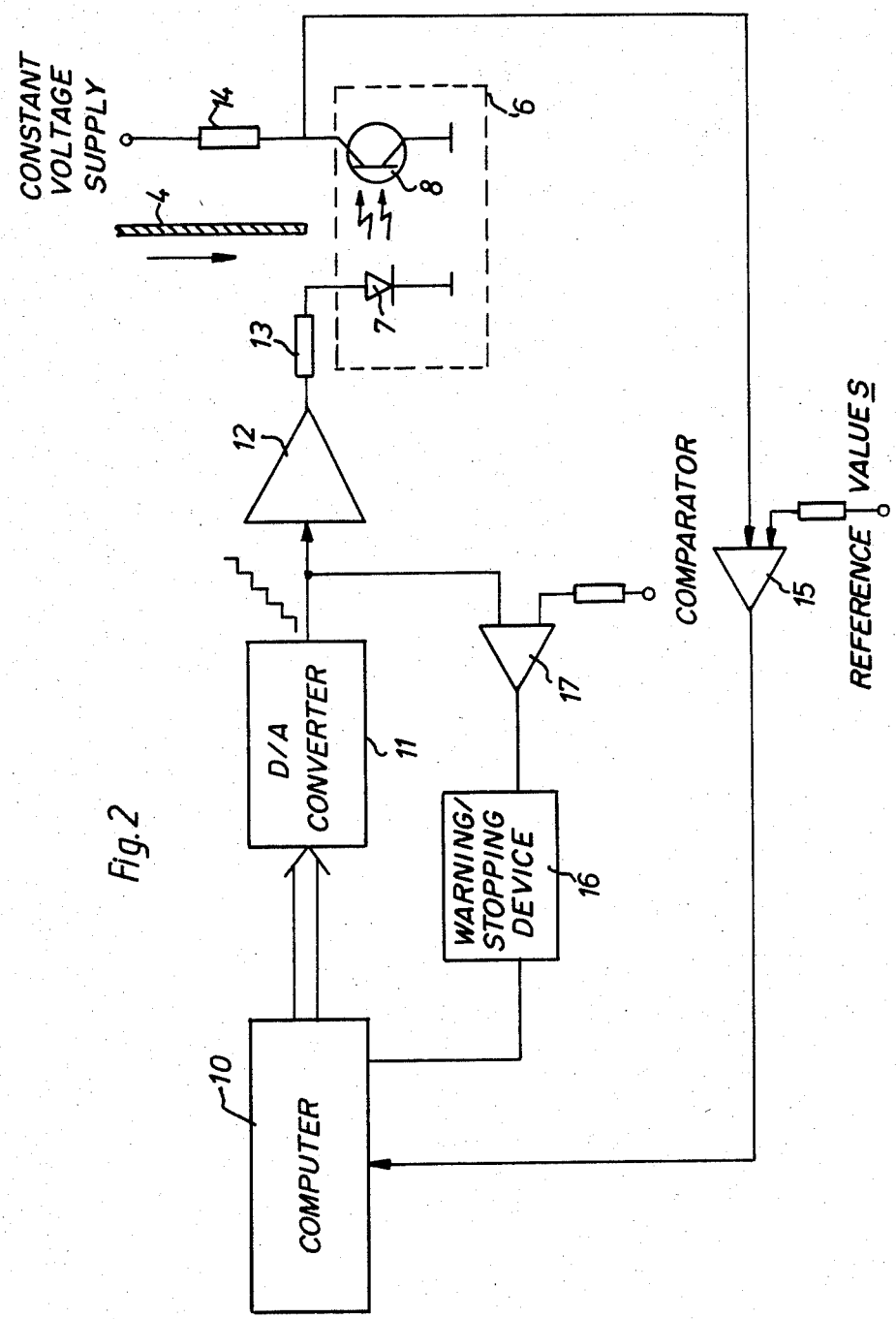
FIG. 2 is a view showing a block diagram of an evaluating circuit of the inventive arrangement.

FIG. 2 also shows the measuring light barrier 6 with the transmitter 7 and the photoreceiver 8. Moreover, the film sheet 4 is here shown as moving between the transmitter 7 and photoreceiver 8. The remaining parts shown in FIG. 2 is the evaluating circuit 9.

The evaluating circuit 9 has a computer 10 and a digital/analog converter 11 connected therewith. The output of the digital/analog converter 11 is connected with a power amplifier 12 which feeds over a resistor 13 the light transmitter 7. The emitter of photoreceiver 8 is grounded. The collector of the photoreceiver 8 is connected via a resistor 14 to a voltage supply, and directly connected to an inlet of a comparator 15. The outlet of the comparator 15 is connected with the computer 10.

The operation of the evaluating circuit 9 is described in connection with FIG. 3.

In accordance with the present invention the light transmitter 7 operates with a variable voltage. The variable supply voltage for the light transmitter is first digitalized in the computer 10 from zero to a maximum value which is subdivided for example into 255 units, as can be seen on the abscissa in FIG. 3. In the digital-/analog converter 11 these units are converted into an analog voltage as shown by the stepped voltage diagram in FIG. 2. The power amplifier 12 amplifies the respective stepped voltage values to the corresponding operational voltages of the transmitter 7. Thereby the intensity of radiation from the transmitter 7 is made variable. The radiation emitted from the transmitter 7 passes either directly or through one, two or more sheets onto the photoreceiver 8 and thereby produces in the latter a different voltage drop. The output of the photoreceiver 8 is connected with another input of the comparator 15. The other input of the comparator 15 is supplied with a reference or threshold voltage which can be selected as a mean value of possible voltage drops at the photoreceiver or, in other words, can amount to half the maximum attainable voltage drop at the photoreceiver. The output of the comparator 15 is connected with the computer 10 and is evaluated in the manner described below.

Figure 3:
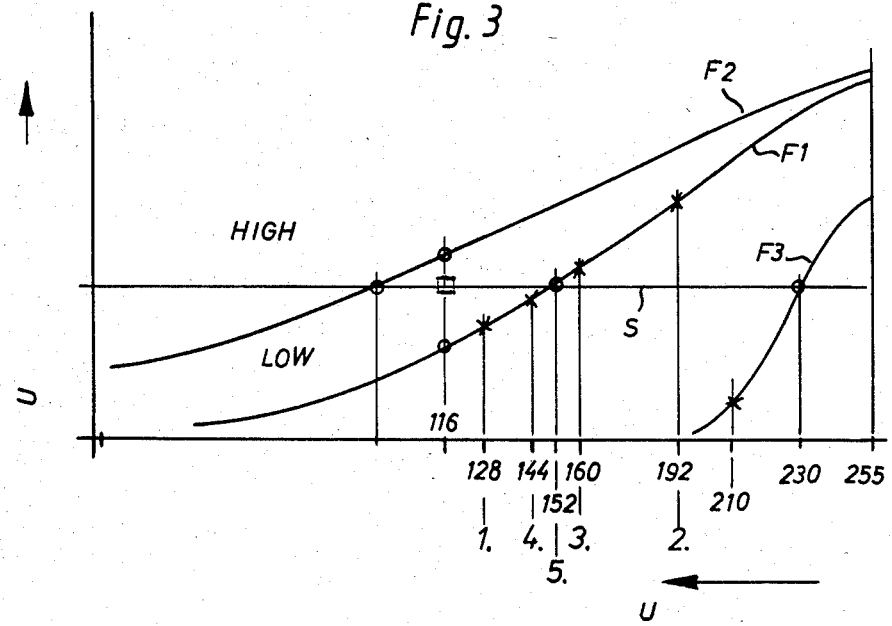
FIG. 3 is a view showing a diagram with voltage characteristic lines at a photoreceiver for various measurement conditions.

The digital voltage values in decimal form stored in computer 10 and applied to the digital/analog converter 11 are plotted in FIG. 3 on the abscissa. The highest digital voltage value 255 corresponds substantially to a zero radiation of the transmitter 7, and the digital value 1 to the highest radiation intensity. The values of the voltage drop at the photoreceiver 8 are plotted on the ordinate, wherein the line extending parallel to the abscissa represents the voltage standard or the voltage threshold applied to the other input of comparator 15.

The intensity at which the transmitter 7 irradiates the movement path of the film sheet 4 is determined by calibration with a first film sheet or test film sheet. For this purpose a first sheet 4 is brought into the light barrier 6, and the computer 10 delivers a maximum control value according to which the light source 7 irradiates. Instead of a maximum control value, also an empirically determined control value can be stored in the computer, with which, for shortening the calibration time, the calibration should begin. In the shown example the decimal value 128 is selected as the first light intensity control value. With this first light intensity the sheet is irradiated and the voltage drop is measured at the photoreceiver 8. This voltage drop is compared in the comparator 15 with the threshold voltage.

FIG. 3 shows a curve F1 which corresponds to the density of a single sheet. The voltage drop because of the low density of this single sheet lies below the adjusted threshold, and the comparator produces the "Low" signal. According to a computer program, the decimal value 128 is halved in the computer and added to the original value (128+64=192) shown in FIG. 3 as the second approximation step. The intensity of the light source 7 is adjusted to this newly obtained calibration value 192, and the corresponding voltage drop at the photoreceiver 8 is compared in the comparator 15 which recognizes a value above the threshold voltage S and produces the signal "High". The last interval of 64 units is again halved, and since the last signal was "High", the resulting value 32 is subtracted from 192 (192−32=160) shown in FIG. 3 as the third approximation step. Since the output signal of the comparator is again "High", the next halved interval is again subtracted (160−16=144). The fourth approximation step lies now in the "Low" region, so that the next halved value (8 units) must again be added (144+8=152).

The approximation or calibration steps are repeated seven times, so that each decimal value between 0 and 255 is involved.

The last decimal value determined in this manner (152) is stored in the computer as a new light intensity control value. When a next film sheet reaches the light barrier 6, the light transmitter 7 is supplied with a voltage corresponding to the new calibration value stored in the computer (152) less an empirically determined decimal value, for example less 36 units resulting in calibration value 116. In the above described calibration process it is possible that the approximated value lies a small decimal value above or below the threshold value. This measuring value therefore, may be too uncertain for use as a reference or threshold voltage. The subtraction of the constant value (36 units) increases the radiation intensity of the transmitter 7 and therefore guarantees that the comparator output is preset to "Low" (116). This constant value (36 units) is determined empirically so as to be located below the threshold line S between the curves F1 and F2 pertaining to a density of a single sheet and a density of two sheets, respectively.

In the event of correct charging when only one film sheet is moved through light barrier 6, the signal "Low" at the comparator output occurs, whereas in the event of double or multiple film sheets the signal "High" is produced and triggers via the computer 10 a warning and/or stopping device 16. With the last mentioned device, various functions can be performed, for example the machine transport can be interrupted and a warning signal can be produced, or the machine transport can be reversed so as to withdraw the double or multiple sheet from the movement path. In the embodiment of the invention here illustrated, the computer 10 can be used for performing additional functions. For example, it is possible to carry out the above described calibration process of the light barrier when there is a command to transport a new sheet. Such a command can be delivered by the operation of the suction device 3. With the regular repetition of the calibration two advantages can be obtained. On the one hand, aging of the optoelectronic structural elements can be counteracted and, on the other hand, a blank sheet recognition is made possible.

When because of aging of the transmitter 7 the light intensity decreases, the current in the transmitter must be increased for obtaining the same light intensity. In the diagram of FIG. 3 the crossing point "Low/High" is to be displaced to the left. Since the calibration step requires significantly less time than the time used for the transportation of a sheet, the calibration step for each sheet can be performed without difficulties by the computer. The respective new value can be again stored. With this automatic post-regulation of the system for each sheet, adjustment of other film sheets with deviating density can be performed.

The curve identified by F3 in FIG. 3 represents the direct irradiation of the photoreceiver 8 by the transmitter 7, or in other words the so-called "blank or missing sheet" curve. When for each released sheet transport per command a calibration of the system takes place, the current supply of the transmitter in the event of a blank or missing sheet is regulated to a decimal value for example to 230. This decimal value can be compared in a further comparator 17 with a value corresponding for example to the decimal location 210. When the crossing point "Low/High" exceeds the decimal location 210, the comparator triggers the warning and/or stopping device 16, since no sheet is delivered and the sheet stack is finished.

For this purpose, one input of the comparator 17 is connected to the output of the digital/analog converter 11, and the other input is connected with a constant voltage source. The output of the comparator 17 is connected with the warning and/or stopping device 16. It is to be understood that the function of the comparator 17 and of the warning and/or stopping device 16 can also be performed in the computer 10.

It will be understood that each of the elements described above, or two or more together, may also find a useful application in other types of construction differing from the types described above.

While the invention has been illustrated and described as embodied in an arrangement for determining two or more superimposed film sheets, particularly X-ray film sheets in a transport path after withdrawal from a film sheet stack, the arrangement comprising a light barrier, it is not intended to be limited to the details shown, since various modifications and structural changes may be made without departing in any way from the spirit of the present invention.

What is claimed as new and desired to be protected by Letters Patent is set forth in the appended claims.

We claim:

1. An arrangement for determining conditions in a transport path for film sheets, comprising:
   a light barrier including a light source arranged at one side of the transport path and a photoreceiver arranged at the opposite side of the transport path to generate a signal proportional to intensity of light received from said light source;
   means for controlling light intensity emitted by said light source; and
   a digital evaluating circuit having an input connected to said photoreceiver and an output connected via said controlling means with said light source to approximate the intensity of emitted light to a reference value related to a predetermined density of said film sheets, said evaluating circuit including a computer storing a set of digital values, said set corresponding to a plurality of control signals for said controlling means, a comparator having an input connected to said photoreceiver, another input connected to a source of a reference value and an output connected to an input of said computer, said computer being programmed for computing from output signals from said comparator a calibration digital value corresponding to a control signal for said controlling means at which a signal generated by said photoreceiver approximates said reference value when a film sheet is present in said light barrier, said computer storing said calibration digital value and upon occurrence of a next sheet in said light barrier, delivering to said controlling means a starting control signal corresponding to said calibration digital value revised by a constant value.

2. An arrangement as defined in claim 1 wherein said controlling means includes a D/A converter connected between said output of said computer and said light source.

3. An arrangement as defined in claim 2 wherein said reference value corresponds to a mean of said plurality of signals generated by said photoreceiver for a single film sheet of an average density.

4. An arrangement as defined in claim 2, comprising a further comparator having an input connected to an output of said D/A converter, another input connected to a source of a second reference value which corresponds to a minimum expected density of a single film sheet, and an output connected to at least one of a warning device and stopping device.

5. An arrangement as defined in claim 4, wherein said further comparator is integrated in said computer.

6. An arrangement as defined in claim 2 further comprising means for controlling the program of said computer in response to each new film sheet introduced in said transport path so as to complete a new output signal for said controlling means from the approximated signal of the preceding sheet.

7. An arrangement as defined in claim 1 wherein said computer stores a set of increasing digital values, said control signals being inversely proportional to the emitted light intensity, and said starting control signal corresponds to said stored calibration digital value diminished by a constant value so that the emitted light intensity is increased and the initial output signal from said comparator falls below said reference value.

8. An arrangement as defined in claim 7 wherein an output of said D/A converter is connected to at least one of a warning device and stopping device to activate said device when the signal generated by said photoreceiver exceeds said reference value.

* * * * *